United States Patent [19]

Simmons

[11] 4,126,110
[45] Nov. 21, 1978

[54] INLET AIR TEMPERATURE CONTROL FOR AN I.C. ENGINE
[75] Inventor: Richard T. Simmons, Troy, Mich.
[73] Assignee: Chrysler Corporation, Highland Park, Mich.
[21] Appl. No.: 805,945
[22] Filed: Jun. 13, 1977
[51] Int. Cl.² .................................... F02M 31/00
[52] U.S. Cl. ........................ 123/122 D; 123/122 H
[58] Field of Search .............. 123/122 D, 122 H; 236/101 C, 101 E, 87, 86; 137/625.11, 625.4

[56] References Cited
U.S. PATENT DOCUMENTS

| | | | |
|---|---|---|---|
| 2,470,572 | 5/1949 | Miller | 236/101 E |
| 3,830,210 | 8/1974 | Muller | 123/122 D |
| 3,918,421 | 11/1975 | Berry | 123/122 D |
| 4,026,464 | 5/1977 | Doherty | 236/87 |

Primary Examiner—Ronald H. Lazarus
Attorney, Agent, or Firm—Baldwin & Newtson

[57] ABSTRACT

The ratio of preheated inlet air to ambient inlet air supplied to an internal combustion engine is controlled by a proportioning valve operated by a vacuum motor. Operating pressure for the motor is controlled by valve means responsive to the inlet air temperature for normally preventing changes in the motor operating pressure, but which selectively connects the motor via a predetermined restriction with essentially atmospheric pressure, or with sub-atmospheric pressure in the engine inlet air induction passage downstream of the throttle valve, when said inlet temperature is correspondingly above or below a predetermined operating range, whereby the operating pressure for the vacuum motor and actuation of the proportioning valve are functions of an algebraic integration of the time intervals that the inlet air temperature varies from the predetermined operating range.

13 Claims, 4 Drawing Figures

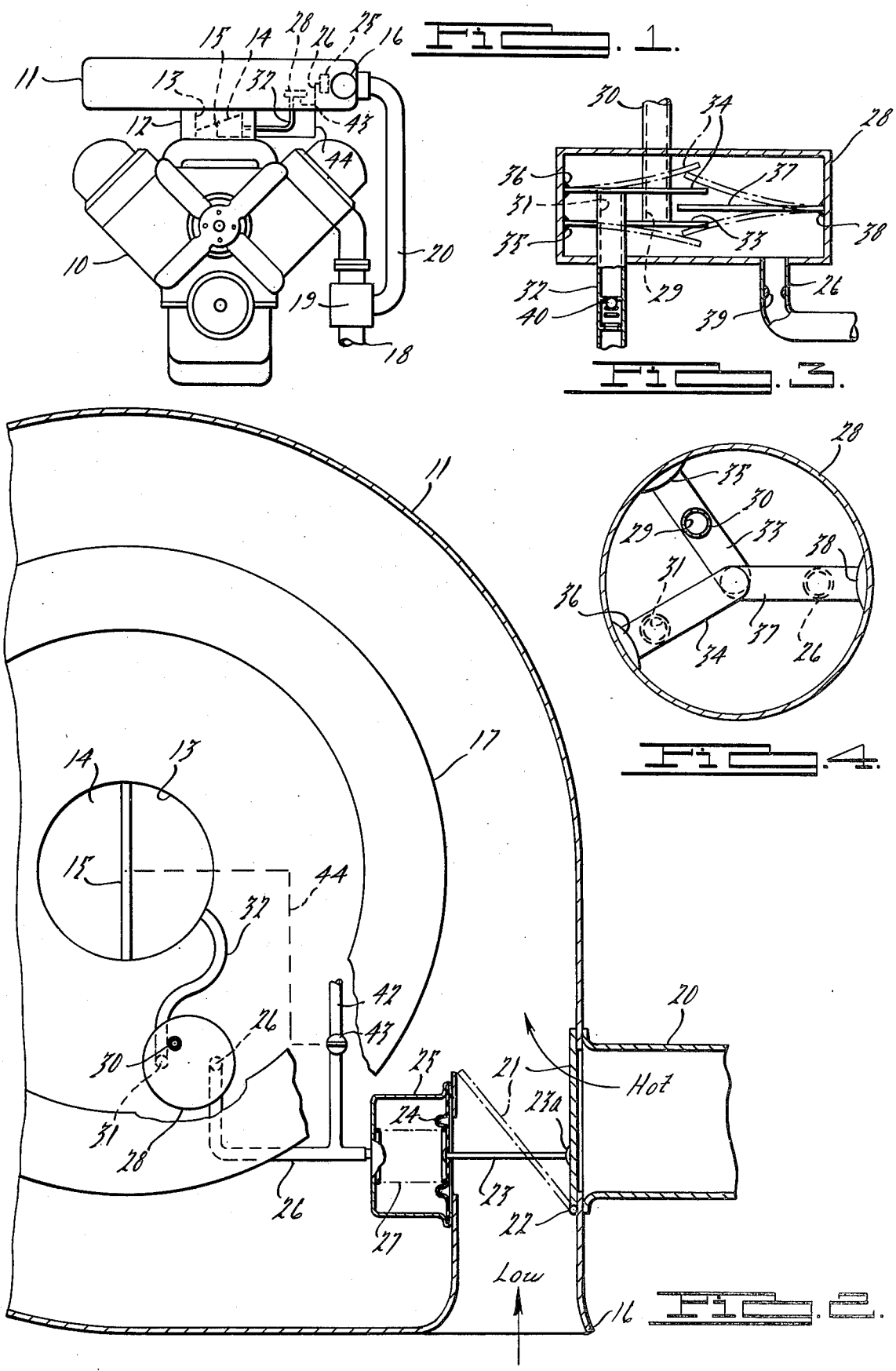

INLET AIR TEMPERATURE CONTROL FOR AN I.C. ENGINE

BACKGROUND AND OBJECTS OF THE INVENTION

This invention relates to the control of the inlet air temperature for an internal combustion engine. In a conventional means for controlling such temperature, as illustrated in the King U.S. Pat. No. 3,444,847, a vacuum motor responsive to the low pressure of the engine inlet induction passage downstream of the throttle operates an inlet air proportioning valve to increase the ratio of preheated air to ambient air in the inlet flow to the engine when the inlet air temperature is less than a predetermined minimum.

An air bleed valve responsive to the inlet air temperature opens at a predetermined maximum temperature to bleed atmospheric air into the vacuum motor and thus into the induction passage to reduce the vacuum actuation of the motor and decrease the ratio to preheated to ambient inlet air. Such a system achieves an approximation of the desired inlet air temperature, but is sensitive to the pressure of the inlet induction passage and to the ambient temperature.

When a rise in the inlet air temperature calls for more ambient air, the air bleed opens to atmosphere, increases the operating pressure for the vacuum motor, and thereby causes the latter to open the proportioning valve to ambient air. Unless the air bleed valve has precise metering characteristics and opens gradually with increasing pressure, the proportioning valve will over react and admit too much ambient air. In any event, after the operating pressure for the vacuum motor and the temperature of the inlet air are stabilized by the position of the bleed valve, the induction vacuum operating the motor will change in consequence of changing engine operating conditions and call for more or less heated air as the case might be, even though the ambient air temperature remains constant.

The bleeding of atmospheric air into the inlet induction passage, as required by prior devices of the type described, may also impair drivability, especially for very small automobile engines where various vacuum operated devices already in use have preempted the vacuum capacity of the inlet induction passage. On the other hand, a convenient aspect of the above described prior devices arises from the fact that at wide open throttle operation when a maximum inlet flow of unheated air is desired, the pressure in the induction inlet passage is a maximum and automatically causes the proportioning valve to open fully to the ambient air and block the inlet of preheated air completely.

Important objects of the present invention are to provide an improved temperature sensor for controlling a vacuum motor to actuate a proportioning valve, whereby a more precise control of the inlet air temperature within a predetermined operating range is achieved then heretofore by comparable devices, wherein actuation of the vacuum motor is not directly susceptible to changes in the inlet induction passage pressure, and whereby the bleeding of atmospheric air into the inlet induction passage during operation of the vacuum motor is virtually eliminated except for negligible bleeding during transient situations.

Another object is to provide such a device that is responsive to operation at wide open throttle for actuating a proportioning valve to shut off the flow of preheated inlet air completely and to admit the maximum inlet flow of ambient air; or in the alternative, that is responsive to the ambient inlet air flow at wide open throttle to close the proportioning valve to preheated air and simultaneously to open the latter to admit the maximum of ambient air.

Another object is to provide such a device that is comparatively simple in structure and operation, economical to manufacture, and highly efficient in operation.

Other objects of this invention will appear in the following description and appended claims, reference being had to the accompanying drawings forming a part of this specification wherein like reference characters designate corresponding parts in the several views.

FIG. 1 is a front end view of an automobile engine having an inlet air preheating system embodying the present invention.

FIG. 2 is an enlarged plan view of the significant structure illustrated in FIG. 1.

FIG. 3 is an enlarged diagrammatic view of the temperature sensor of FIG. 1.

FIG. 4 is a digrammatic plan view of FIG. 3.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of my invention is illustrated by way of example with an automobile internal combustion engine 10 having an inlet air and filter housing 11 mounted on a carburetor 12 for supplying inlet air to the engine via a central inlet air induction passage 13. A throttle valve 14 is pivotally mounted at 15 within the passage 13 to control the inlet air flow. An air inlet or snorkel 16 opens into the housing 11 to supply air thereto at essentially ambient atmospheric temperature and pressure, which air passes through the annular filter 17, then axially into the central induction passage 13, past the throttle 14, and finally to the engine for combustion therein. The hot combustion exhaust products are discharged to the atmosphere via an exhaust header or pipe 18 having a stove 19 associated therewith for preheating a second source of inlet air. Preheated air from the stove 19 is carried by an inlet air duct 20 into the housing 11 adjacent and immediately downstream of the snorkel 16 for mixing with the ambient air.

A proportioning gate or valve 21 normally closes the passage 20 into the housing 11 when the inlet air temperature is above a predetermined maximum as explained below, and is pivoted on the housing 11 at 22 for swinging counter-clockwise in FIG. 2 to admit heated air and to close or partially close the opening of snorkel 16 into the housing 11 when the inlet air temperature falls below a predetermined minimum. By suitably varying the ratio of heated inlet air to the ambient inlet air, the resulting inlet air temperature may be controlled for optimum engine operation.

The position of the valve or gate 21 is determined by the position of a plunger 23 pivotally connected at one end 23a to the gate 21 and connected at its opposite end to a flexible diaphragm 24 comprising a movable wall of a vacuum motor 25. A conduit 26 comprises the only communication with the interior of the motor 25. It is thus apparent that upon the application of a sub-atmospheric pressure within motor 25 via conduit 26, the diaphragm 24 and plunger 23 are moved leftward in FIG. 2 to open valve 21 for admitting preheated air from the stove 19 via conduit 20. A biasing spring 27 seated within the motor housing 25 urges the diaphragm 24 rightward in FIG. 2 to close the heated air passage 20 from the housing 11 and to open the latter for receiving ambient air via snorkel 16.

The conduit 26 extends from the motor 25 and communicates with the interior of a temperature sensor housing 28 having a port 29 opening via duct 30 into the filter housing 11 downstream of the filter 17 to essentially atmospheric pressure, and also having a second port 31 in communication via duct 32 with the induction passage 13 at a location downstream of the throttle 14. A pair of reed valves 33 and 34 normally close the ports 29 and 31 respectively to seal the interior of housing 28 from external pressure variations.

As illustrated in FIG. 4, the housing 28 in the present instance is cylindrical and the reed valves 33 and 34 extend radially from peripheral attachments 35 and 36 respectively with the interior cylindrical wall of the housing 28. The reed valve 34 normally overlies the upwardly directed port 31 to close the same and is yieldably upwardly to open the port 31 to communicate the sub-atmospheric pressure of the induction passage 13 to the interior of the housing 28. The reed valve 33 normally underlies the downwardly directed port 29 to close the same and is yieldably downwardly to open the latter port to admit substantially atmospheric pressure into the housing 28.

The reed valves 33 and 34 are controlled by a temperature responsive bimetal 37 secured at 38 to the cylindrical wall of the housing 28 and extending radially inwardly at a location intermediate the reed valves 33 and 34, FIGS. 3 and 4. Also as illustrated in FIGS. 1 and 2, the location of housing 28 within the filter housing 11 downstream of the filter 17 renders the bimetal 17 responsive to the temperature of the filtered inlet air entering passage 13 downstream of the proportioning valve 21. The bimetal 37 is calibrated so that when the latter temperature is within a predetermined operating range, both ports 29 and 31 are closed. Thus, whatever pressure is within the housing 28, that pressure will be sensed by the motor 25 and the latter with plunger 23 and proportioning valve 21 will be locked in their adjusted positions regardless of pressure changes in the induction passage 13 resulting from engine operation.

In the event that the filtered inlet air temperature is colder than desired for proper engine operation, the bimetal 37 will move upwardly to unseat reed valve 34 from port 31 and connect the interior of housing 28 via 32 with the sub-atmospheric pressure of the induction passage 13 downstream of throttle 14. Any pressure change in housing 28 is then communicated via a restriction 39 in conduit 26 to the vacuum motor 25 to actuate the diaphragm 24. If the pressure in housing 28 as a result of opening port 31 becomes less than the pre-existing pressure in the vacuum motor 25, the latter pressure will be gradually reduced in consequence of the restricted fluid flow through restriction 39, causing gate 21 to move counter-clockwise gradually to increase the ratio of heated air from passage 20 with respect to the ambient air via snorkel 16. As the inlet air temperature to which the bimetal 37 is responsive gradually increases to the normal or desired operating temperature, the bimetal 37 gradually moves to the centered position illustrated to enable closing of port 31 by reed valve 34. As long as the temperature thereafter remains in the desired operating range, the gate 21 will remain fixed in its adjusted position regardless of changes in engine operating conditions that affect the sub-atmospheric pressure in the induction passage 13. In the event of a subsequent increase in the ambient temperature, such that the resulting inlet air temperature rises above the desired operating range, the bimetal 37 will move downwardly against reed valve 33 and open port 29 to the essentially atmospheric pressure within housing 11, thereby to increase the pressure applied to motor 25 gradually via restriction 39 until the gate 21 is adjusted to admit more ambient air and less heated air in the proportion required to achieve the desired inlet air temperature.

During the time that port 31 is open, a limited amount of air will bleed into the inlet induction passage 13 via restriction 39 and conduit 32, but the total of such bleeding cannot exceed the combined volumes of housing 25 and 28 which will be nominal. The volume of housing 28 especially will be as small as feasible.

In the event that the pressure within housings 28 and 25 is less than the sub-atmospheric pressure within the induction passage 13 as a result of previous operation of the reed valve 34 and opening of port 31, a one-way check valve 40 in conduit 32 prevents communication between the induction passage 13 and the interior of housing 28 regardless of the position of reed valve 34. Such a situation might result temporarily during acceleration from a cruising condition, for example. The pressure in induction passage 13 will rise in consequence of the acceleration and might exceed the pressure in chamber 28. If during the acceleration, the inlet air temperature to which bimetal 37 is responsive should fall below the predetermined operating range and cause bimetal 37 to lift reed valve 34 and open port 31, the check valve 40 will prevent the higher induction passage pressure from entering chamber 28 and motor 25 and moving gate 21 clockwise to decrease the proportion of heated inlet air from conduit 20. As soon as the temporary acceleration ceases, the induction passage pressure will return to the cruise condition and to a pressure less than the pressure in sensor housing 28, thereby to operate motor 25 to open gate 21 to admit more heated inlet air from conduit 20 and decrease the ambient inlet air from snorkel 16 until the resultant inlet air temperature sensed by bimetal 37 rises to the desired operating range.

It is conceivable in the situation described immediately above that the final cruise speed following the acceleration will be so great that the induction passage pressure communicated to conduit 32 will still be higher than the pressure in the sensor housing 28. In such an event, a demand for warmer inlet air by upward movement of bimetal 37 to open port 31 will have no effect upon motor 25. However, the area of diaphragm 24 and the size of spring 27 are determined with respect to the size of the engine 10 so that the latter event will occur only at velocities near wide open throttle that will not normally be sustained for extended time intervals. During such temporary unusual high velocities, the engine will be working so hard and the inlet air flow will be so great that adequate mixing and evaporation of the liquid fuel will take place before entering the engine combustion chamber. Thus driveability will not be seriously impaired even though the inlet air temperature might be somewhat below the desired operating range.

By virtue of the inevitable time lag required for the bimetal 37 to adapt itself to changing inlet air temperatures, an initial demand for warmer inlet air might result in an opening of the gate 21 to more heated inlet air than is desired before the bimetal 37 enables closing or port 31 via reed valve 34 for example. The overheated inlet air will then move the bimetal 37 downwardly and move reed valve 33 to open port 29 and enable a more precise adjustment of the positiion of gate 21. The resulting pressure in housing 28 after closure of port 29 will be a function of a summation of the time intervals that port 29 has been opened, minus a summation of the time intervals that port 21 has been opened or, in other words, the algebraic summation of the time intervals that ports 29 and 31 have been open. The time intervals that port 29 is open for increasing the pressure within housing 28 may be considered positive and the time intervals that port 31 is open to reduce the pressure may then be considered negative.

It is also to be noted that the effect of hunting by the thermostat or bimetal 37 to establish the proper opening of gate 21 is minimized by the restriction 39 and the volume of housing 28. The volume of housing 28 is preferably negligible with respect to the volume of the housing 25, so that the position of the diaphragm 24 and proportioning gate 21 resulting from the algebraic integration of the time intervals that the ports 29 and 31 have been open will be determined by the volume of housing 25 and the size of the restriction 39. Obviously, the greater the resistance to fluid flow effected by restriction 39, and the greater the volume of motor 25, the more slowly will be the movement of diaphragm 24 and gate 21 in response to opening of either of the ports 29 or 31, and as a cololary the more closely to the desired operating temperature will be the temperature of the inlet air when the bimetal 37 moves to the intermediate neutral position illustrated whereat both ports 29 and 31 are closed.

In order to enable rapid movement of gate 21 to the wide open position for ambient air, whereat the heated inlet air duct 20 is completely closed, a second air bleed port 42 opens from the atmosphere into the vacuum motor 25 on the vacuum motor side of restriction 39. Port 42 is normally closed by a valve 43 operatively connected as indicated by 44 with the throttle valve 14 for opening port 42 to the pressure within housing 11 downstream of the filter when throttle valve 14 moves to the wide open position. Thus regardless of the temperature of the inlet air and the position of bimetal 37, atmospheric pressure will be applied to the diaphragm 24 to move the gate 21 clockwise in FIG. 2 to the position for admitting the maximum ambient air as desired for wide open throttle operation. During such wide open throttle operation, the temperature of the inlet air will drop to the ambient temperature, tending to cool the thermostat 37 and open port 31 to call for warmer air. By virtue of restriction 39, only a small bleed to the sub-atmospheric pressure in the induction passage 13 will result during the wide open throttle operation and such bleeding will be nominal because at wide open throttle the pressure in the induction passage 13 will also be neaarly atmospheric. The nominal air bleed into passage 13 will be unobjectionable in comparison to the comparatively large air flow at wide open throttle and will have negligible effect upon the engine operation.

When the wide open throttle operation terminates, the closing or partial closing of the throttle 14 will actuate valve 43 to close port 42 from motor 25 and return the temperature control system to its customary mode of operation.

Having described my invention I claim:

1. In an assembly responsive to temperature for controlling the application of pressure from two separate pressure sources to a pressure actuated motor, the combination comprising a housing having a hollow interior and two ports communicating with said interior for connecting the latter with the separate pressure sources respectively and having a third port communicating with said interior for connecting the latter with a motor, and means for selectively connecting said interior with one or the other of the first named two ports comprising temperature responsive valve means normally closing said first named two ports to each other and to said interior and responsive to temperature below or above a predetermined operating temperature range respectively for opening only one or only the other said first named two ports to said interior.

2. The combination according to claim 1 and also comprising two separate pressure sources connected with said first named two ports respectively for selective communication with said interior, said temperature responsive valve means comprising means responsive to temperatures below said operating temperature range for connecting said interior with said one pressure source and also comprising means responsive to temperatures above said operating temperature range for connecting said interior with said other pressure source.

3. The combination according to claim 1 and also comprising one-way check valve means for preventing fluid flow into said interior through said one port.

4. The combination according to claim 1 and also comprising means for effecting a restricted fluid flow between said interior and third port.

5. The combination according to claim 4 and also comprising one-way check valve means for preventing fluid flow into said interior through said one port.

6. The combination according to claim 4 and also comprising a pressure actuated motor connected via said third port with said interior for actuation in response to the pressure in the latter.

7. The combination according to claim 6 and also comprising one-way check valve means for preventing fluid flow into said interior through said one port.

8. The combination according to claim 1 and also comprising an air induction passage for an internal combustion engine, first and second air inlet means for said induction passage for receiving ambient inlet air and preheated inlet air respectively, means for controlling the temperature of the inlet air flow comprising proportioning valve means for controlling the ratio of ambient inlet air flow through said first air inlet means into said induction passage with respect to preheated inlet air flow through said second air inlet means into said induction passage, a pressure actuated motor responsive to sub-atmospheric pressure for yieldingly urging said proportioning valve means to decrease said ratio, biasing means for yieldingly urging said proportioning valve means to increase said ratio, means for selectively communicating sub-atmospheric pressure of said induction passage to said motor or for selectively communicating substantially atmospheric air pressure to said motor comprising means cooperable with said one of the first named two ports for connecting said induction passage with said interior for inducing therein said sub-atmospheric pressure when said temperature responsive valve means responds to a temperature below said operating range, means cooperable with the other of said first named two ports for connecting said interior with substantially atmospheric pressure when said temperature responsive means responds to a temperature above said operating range, and means cooperable with said third port for connecting said interior with said motor for applying the pressure within said interior to said motor.

9. The combination according to claim 8 and also comprising one-way check valve means for preventing fluid flow through said one of said first named two ports into said interior from said induction passage.

10. The combination according to claim 8 and also comprising means for effecting a restricted communication between said interior and motor via said third port.

11. The combination according to claim 10 and also comprising one-way check valve means for preventing fluid flow through said one of said first named two ports into said interior from said induction passage.

12. The combination according to claim 8 and also comprising atmospheric bleed port means for effecting comparatively unrestricted communication between essentially atmospheric pressure and said motor, bleed port valve means normally closing the last named communication with said motor, a throttle in said induction passage for controlling air flow therein, and means operatively connecting said throttle with said bleed port valve means and responsive to movement of said throttle to a wide open condition for opening said bleed port valve means and effecting said last named communication.

13. The combination according to claim 12 and also comprising one-way check valve means for preventing fluid flow through said one of said first named two ports into said interior from said induction passage, and means for effecting a restricted communication between said interior and motor via said third port.

* * * * *